Feb. 14, 1950     W. W. BEMAN     2,497,431
CRITICAL SPEED INDICATOR

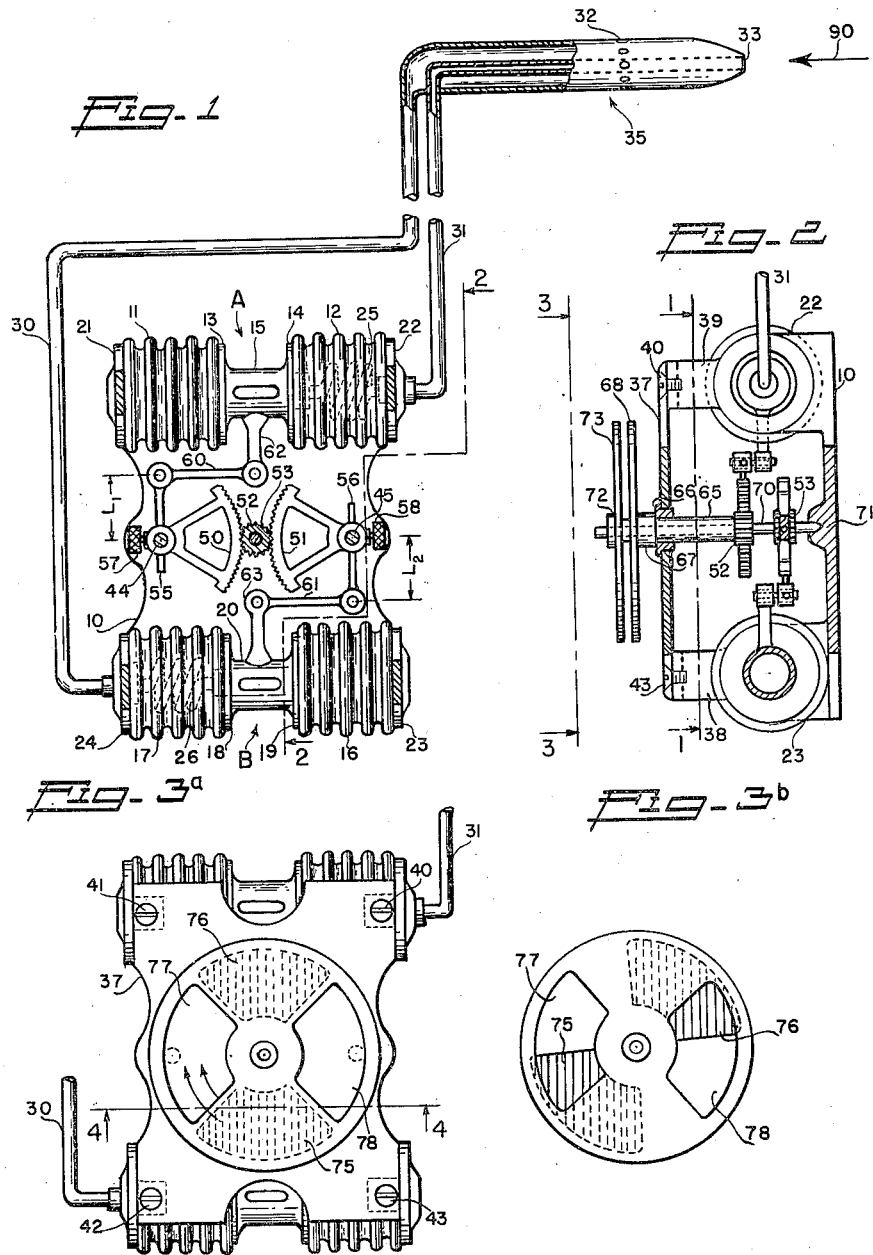

Filed Sept. 8, 1944     2 Sheets-Sheet 2

INVENTOR.
WARD W. BEMAN
BY
George Sullivan
AGENT

Patented Feb. 14, 1950

2,497,431

UNITED STATES PATENT OFFICE 2,497,431

CRITICAL SPEED INDICATOR

Ward W. Beman, Glendale, Calif., assignor to Lockheed Aircraft Corporation, Burbank, Calif.

Application September 8, 1944, Serial No. 553,250

12 Claims. (Cl. 244—78)

This invention relates to fluid velocity indicators in general and, more specifically, to apparatus for indicating the approach and attainment of relative fluid speeds corresponding to predetermined fractions of the velocity of sound therein. The ratio of the relative speed of the fluid to the local velocity of sound in the fluid is known as the Mach number. This invention finds its principal application to aircraft use in indicating when a relative air speed corresponding to a specific Mach number has been reached and is particularly adapted to give a warning signal when the critical air speed or Mach number of an aircraft has been attained at which compressibility effects render further increase of speed dangerous.

Airplanes when flown or, as is more usually the case, when dived at speeds such that the velocity of the air relative to certain parts of the airplane structure, particularly the wings and control surfaces, approaches closely that of sound, a phenomenon commonly termed "the compressibility effect" occurs which is evidenced by violent vibrations accompanied by loss of lift of the airfoils and corresponding degrees of loss of control of the airplane. At such critical speeds structural damage may be done and total loss of the aircraft may result.

It is consequently the object of this invention to provide an instrument which is capable of giving a warning of the approach of a condition under which a relative air speed corresponding to a predetermined fractional portion of the local speed of sound or Mach number obtains.

It is a further object of this invention to provide an instrument which is capable of indicating when a relative air speed has been attained which is a given predetermined fractional portion of the local speed of sound.

It is a further object of this invention to provide an instrument which is capable of giving a warning signal when a critical relative air speed or critical Mach number is being closely approached at which compressibility effects will occur.

The objects are accomplished in general by providing a means for measuring the ratio of the apparent absolute total head to the apparent absolute static head at a suitable local point in the relative fluid stream. In its more specific application to the airplane, the object of the invention is accomplished by sensing the ratio of the absolute total pressure to the absolute static pressure in the relative airstream as measured by means of a Pitot tube or the like device provided with static and dynamic openings into the fluid stream, in connection with pressure differential actuated means connected to the said total head and static head openings of the Pitot tube, said means being so constructed and arranged as to indicate when a predetermined given ratio of such apparent absolute total pressure to apparent absolute static pressure exists.

The invention is based on the fact that for each Mach number there is one and only one ratio of apparent absolute total pressure to the apparent absolute static pressure in the fluid stream independent of temperature and altitude and the preferred embodiment of the invention comprises broadly a dual pressure gauge type of instrument having one pressure responsive element which is subjected to the absolute total pressure and another pressure responsive element which is subjected to the absolute static pressure as sensed by a Pitot tube or similar device located in the fluid stream. One of the pressure responsive elements is especially adapted to be responsive or to actuate an indicator in accordance with a given multiple of that of the other element for the same pressures, as more fully described hereinafter, whereby the indicator of the instrument as actuated by the two said elements which are otherwise only responsive in accordance with a function of their pressure differential is rendered capable of indicating a given predetermined pressure ratio corresponding to a specified Mach number.

These and other objects and features of novelty will become evident hereinafter in the description which, together with the following drawings, illustrate preferred embodiments of the invention.

Figure 1 is a plan view of the apparatus of this invention shown partially in section as taken on line 1—1 of Figure 2.

Figure 2 is a side elevation partially in section taken on line 2—2 of Figure 1.

Figure 3a is a plan view taken from line 3—3 of Figure 2 showing the indicator dial arrangement.

Figure 3b is a plan view of the indicator dials as viewed from line 3—3 illustrating a typical displacement of the dials by operation of the apparatus.

Figure 4 is a sectional elevation taken on line 4—4 of Figure 3a.

Referring now to the drawings in which like reference numerals refer to corresponding parts throughout the several figures, the apparatus of the invention is as follows:

Figure 4:
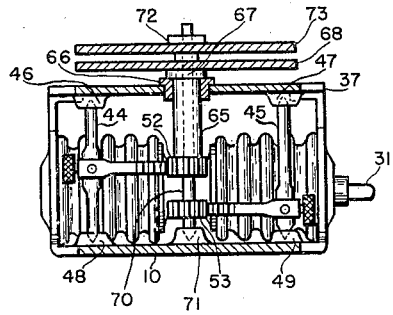

Referring primarily to Figures 1 to 4, 10 is the bottom or base plate of the frame of the instrument which supports a pair of double bellows assemblies A and B.

The bellows assembly A comprises an evacuated bellows 11 and a pressure bellows 12, the inner adjacent heads 13 and 14 of which are mechanically intercoupled by means of a hollow tubular strut or sleeve 15. The bellows assembly B is similar to that of A and comprises an evacuated bellows 16 and a pressure bellows 17, the inner adjacent heads 18 and 19 of which are mechanically intercoupled by means of a hollow tubular strut or sleeve 20. The bellows assemblies A and B are respectively supported upon the frame 10 in parallel rigidly spaced arrangement as best shown in Figure 1 by means of two pairs of leg members 21—22 and 23—24 integrally formed of upturned corner portions of the base 10. The pressure bellows 12 and 17 carry interior, helical tension springs 25 and 26 axially interconnecting their respective bellows heads. These springs 25 and 26 serve to resist, resiliently, and to regulate the deformation of the bellows in proportion to the applied pressure.

Pressure bellows 17 and 12 are connected through the tubes or capillaries 30 and 31 respectively to the static and dynamic openings 32 and 33 in a conventional Pitot tube as illustrated at 35.

A top plate member 37 of the instrument frame is supported upon the upper extensions of the bellows supporting leg members 21—22 and 23—24 as best shown at 38 and 39 in Figure 2 and attached thereon by suitable means such as machine screws 40, 41, 42 and 43.

Intermediate the base plate 10 and the top plate 37 of the frame are a pair of gear segment shafts 44 and 45 carried in suitable pivots 46 and 47 on the upper plate 37 and pivots 48 and 49 on the said lower plate 10 all as best shown in Figure 4. The gear segment shafts 44 and 45 pivotally support a pair of gear segments 50 and 51 which in turn mesh with the dial staff pinions 52 and 53 respectively. Levers 55 and 56 extend through the enlarged hub portion of the gear segments 50 and 51 and are adjustably retained therein by means of set screws 57 and 58. The outer pivotal ends of the levers 55 and 56 are pivotally connected through links 60 and 61 to actuator arms 62 and 63 which are rigidly attached to and extend laterally from the midpoints of the beforementioned bellows spacer struts 15 and 20 respectively.

Referring now primarily to Figures 2 and 4, the uppermost dial staff-pinion 52 is fixed to the lower end of the tubular dial staff 65 which is in turn rotatively supported from its upper end in bearing 66 located in the central portion of the upper plate 37. The said staff 65 is rotatably supported upon the upper surface of bearing 66 by means of an integral collar 67. The upper surface of the collar 67 is fixed to the lower dial 68. The lower staff-pinion 53 is fixed to the lower portion of the staff 70 which is rotatably supported at its lower end in pivot bearing 71 located in the central portion of the base plate 10. The staff 70 extends upward through the bore of the tubular staff 65 and is fixed at 72 to the center of upper dial 73. The upper and lower dials 73 and 68 are thus coaxially and rotatively supported with respect to one another. Angular rotation of the gear segment 50 acting through the meshing staff-pinion 52 is thus adapted to rotate the tubular staff 65 and the lower dial 68. Similarly, angular rotation of the gear segment 51 acting through the meshing staff-pinion 53 is adapted to rotate the coaxial staff 70 and the upper dial 73. The mechanical advantages or gear ratios between pinions and corresponding gear segments and actuating levers may, in general except as hereinafter specified, be any suitable value to give the desired dial movement over the maximum pressure ranges obtained in the operation of the instrument.

The indicator dials 68 and 73 may be of any suitable form or pattern which will readily and visibly indicate a predetermined relative position. However, in a preferred form the lower dial 68 is provided with a pair of diametrically positioned segmental shaped color areas as illustrated by the outline and cross-hatching at 75 and 76 in Figure 3b and by the dotted outlines and dotted cross-hatching at 75 and 76 in Figure 3a. The upper dial 73 is provided with a pair of matching, segmental openings as shown at 77 and 78 in Figures 3a and 3b. Upon relative rotation of the dials 68 and 73, the colored areas 75 and 76 may be hidden or partially or wholly viewed through the segmental openings 77 and 78 of the upper dial, depending upon the relative positions of said dials, as best illustrated in Figures 3a and 3b. Areas 75 and 76 are preferably of a bright red and serve as a visual indicator or warning as hereinafter more fully described in connection with the operation.

Figure 5:
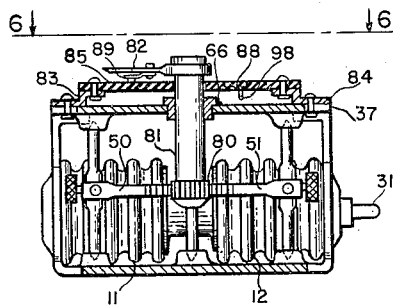
Figure 5 is a cross-sectional elevation of an alternative modification of the invention viewed from a position corresponding to line 4—4 of Figure 3a and taken on line 5—5 of Figure 6.
Figure 6:
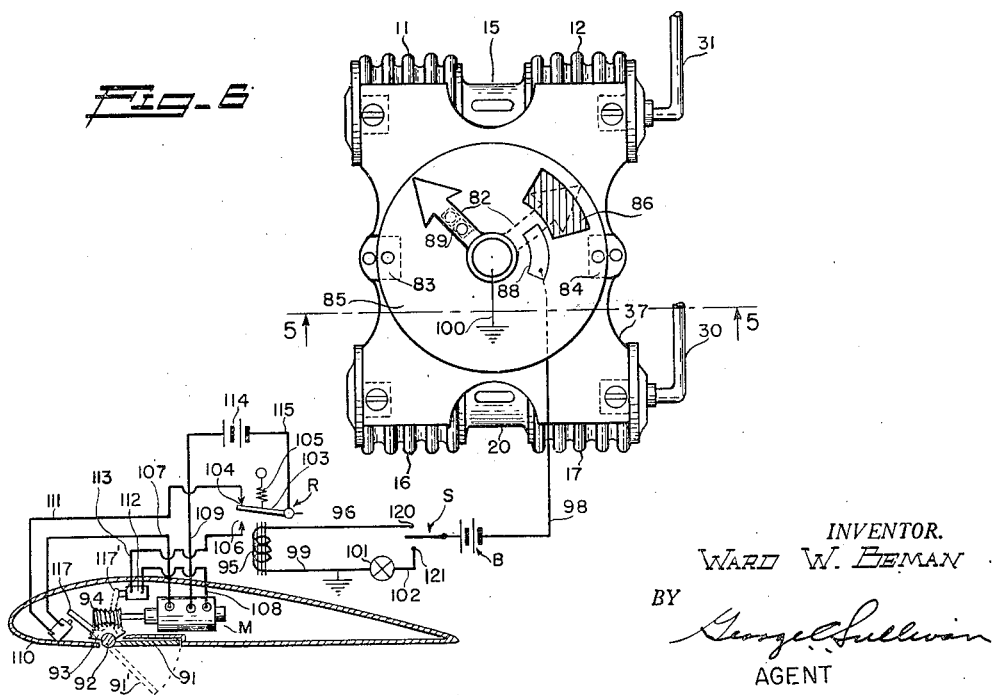
Figure 6 is a plan view taken from line 6—6 of Figure 5.

Referring now primarily to Figures 5 and 6, an alternative arrangement or modification of the apparatus of this invention is there illustrated. The apparatus of Figures 5 and 6 is similar to that illustrated in Figures 1 to 4 except the positions of the vacuum bellows 16 and the pressure bellows 17 of bellows assembly B are reversed in the instrument frame as compared to the positions for the same assembly shown in Figures 1 and 3a and the gear sectors 50 and 51 instead of acting upon separate staff-pinions 52 and 53 are arranged to both mesh with and act upon a single staff-pinion as shown at 80 which is carried on the hand-staff 81. The hand-staff 81 which passes through bearing 66 centrally located in the upper plate 37 carries at its upper end an indicator hand 82. Immediately below the indicator hand 82 and supported at 83 and 84 from the upper plate 37 of the instrument frame is a circular dial or face 85 over which the said hand 82 is adapted to travel in an arc with rotation of staff 81. Suitably located on the upper face of the dial 85 is a colored mark or area as shown at 86, with which the beforementioned hand 82 upon rotation is adapted to cooperate in forming a visual warning as hereinafter more fully described in connection with the operation.

The dial 85 which may be made of a suitable insulating material such as Bakelite, in addition to the colored area 86 may also be provided with a metallic contactor segment 88 located adjacent the colored warning area 86 and recessed flush with the dial surface. A contact button carried on the shank of the hand 82 and extending from the lower surface thereof is adapted to slide in an arc over the face 85 and to make contact with the segment 88 upon angular rotation of the hand into a position approximating that illustrated in dotted lines at 82'.

In co-pending application Serial Number 476,715, now Patent Number 2,450,709, a control baffle or flap has been shown and described which is effective in regaining control or re-establishing lift of an airfoil operating in the critical speed range in which compressibility effects occur. The apparatus of the present invention may be advantageously adapted to automatically actuate such control baffles or flaps on an airplane which has purposely or indvertently reached a relative air speed at which compressibility effects occur. A typical wing section is illustrated at 90 carrying a forwardly located flap 91 pivoted on the lower surface at 92, said typical section and flap combination being similar to that shown and described in the beforementioned co-pending application.

The closed position of the flap is shown at 91 and the fully opened control recovery position is shown in dotted lines at 91'. A segmental gear 93 for actuation of the flap is fixed to the flap shaft at 92 and meshes with a worm gear 94 which in turn is driven by reversible electric motor M suitably located in the wing or elsewhere in the aircraft as desired. R is an electric relay having an actuating electro-magnet 95, one terminal of which may be electrically connected to the beforementioned contactor segment 88 located on the instrument dial by way of conductor 96, contact point 120, switch S, battery B and conductor 98 and the other terminal of which is electrically connected to the contact button 89 on the hand 82 by way of the conductors 99 and 100 and the intermediate ground circuits as indicated. An electric signal light 101 may be alternatively connected in the circuit instead of the magnet coil 95, through conductor 102, point 121, and switch S. The armature 103 of the relay R is normally retained in contact with point 104 by means of spring 105. When the relay magnet 95 is energized the armature 103 is moved into contact with point 106.

The conductors 107 and 108 lead to the forward and reverse fields of the motor M and the central lead 109 is the common return conductor therefrom. The lead 107 makes connection by way of a series connected limited switch 110 and conductor 111 with the beforementioned contact point 104. The lead 108 makes connection by way of a series connected limiting switch 112 and conductor 113 with the beforementioned contact point 106. The common conductor 109 makes connection to battery 114 and conductor 115 with the armature 103 of the relay R. The limit switches 110 and 112 may be of any of the well known types of series snap switches or micro-switches such as the "Switchette" manufactured by the General Electric Company. The limit switch 110 is adapted to open the circuit between conductors 107 and 111 when the arm 117 carried by the flap shaft 92 moves into contact with the switch actuator button at the position shown corresponding to the fully closed position of the flap 91. The limit switch 112 on the other hand is similarly operated upon contact by the arm 117 as shown in dotted lines at 117' at the limit of its angular travel corresponding to the fully opened position of the flap as indicated at 91'.

The operation of the apparatus of this invention is as follows:

As the Pitot tube 35 moves with increasing relative velocity with respect to the air as indicated by the arrow 90, the dynamic pressure builds up at the axial entrance 33 and the static pressure at the lateral openings 32 changes in response to change in altitude and these pressures communicated through the beforedescribed interconnecting tubes 31 and 30 respectively are applied to the pressure bellows 12 and 17. Since the bellows 11 and 16 are evacuated and the inner adjacent heads of the vacuum and pressure bellows are mechanically coupled by means of the before described struts 15 and 20, the resulting change in length of the pressure bellows 12 and 17 and the accompanying axial motion of struts 15 and 20 will be proportional to the change in absolute pressures therein. The resultant axial motions of the bellows 12 and 17 and struts 15 and 20 carrying the actuator arms 62 and 63 are transmitted from said arms through the linkages 60 and 61, through the adjustable levers 55 and 56 to the corresponding pivotal gear segments 50 and 51. The said gear segments 50 and 51 acting upon the meshing pinions 52 and 53 as the pressure in the bellows 12 and 17 are progressively increased, for example, results in clockwise rotation of both the dial staffs 65 and 70 and the dials 68 and 73 carried thereon.

The instrument as best shown in Figures 1 to 4 inclusive is inherently operative to effect a co-rotation of the discs 68 and 73 with a relative motion with respect to one another which is proportional to the difference of the absolute total pressure transmitted to bellows 12 and the absolute static pressure transmitted to the bellows 17. With bellows 12 and 17 having the same cross-sectional area, levers L1 and L2 of the same length, and the gear ratio through to the discs from the gear segments 50 and 51 to the pinions 52 and 53 and through to the discs 68 and 73 being alike, the instrument would be only capable of giving an indication which is proportional to the difference of the absolute total and absolute static pressures imposed upon the bellows 12 and 17 as hereinbefore mentioned. However, by adjusting the lengths of the levers L1 and L2 to unequal lengths so that the motion imparted to one of the indicator discs is a given multiple of the motion imparted to the other of the discs for equal motions of the bellows corresponding to equal pressure changes, the instrument may be made operative to give an indication of one given predetermined pressure ratio.

Thus, in the instrument herein illustrated where, as before stated, the gear ratios between each bellows assembly and its corresponding indicator dial are otherwise identical, the ratios of the motions of the indicator dials will be inversely proportional to the relative adjusted lengths, $L_1$ and $L_2$ of levers 55 and 56. Thus under these conditions for equal displacements of the two bellows assemblies the ratio of the motion of disc 68 to that of disc 73 will be equal to $$\frac{L_2}{L_1} = K$$

Hence, where the bellows cross-sectional areas are constructed equal, as herein illustrated, the indicator reading D which is the difference of the angular displacements of the indicator dials 68 and 73 will be equal to $(P_t - KP_s)$ where $P_s$ equals the absolute static pressure impressed upon bellows 17 and $P_t$ equals the sum of the absolute static and dynamic pressure impressed upon bellows 12 as viewed by the Pitot 35.

The instrument as thus constructed and adjusted so that $D = (P_t - KP_s)$, is operative in accordance with a function of the differential of the pressures impressed upon the two bellows assemblies but is incapable of giving a continuous measure of the ratios of these differential pressures.

The ratio R of the absolute total pressure, $P_t$ to the absolute static pressure $P_s$ is obviously:

$$R = \frac{P_t}{P_s} \text{ or } RP_s = P_t$$

Therefore, since $D = P_t - KP_s$ by substitution it is evident that $RP_s - KP_s = D$ or $P_s(R-K) = D$ and hence when the pressure ratio $R$ is equal to $K$, then $D = 0$.

Therefore, it is evident that the instrument is capable of indicating when one specific pressure ratio exists (R), that ratio being numerically equal to the multiple $$\frac{L_2}{L_1} = K$$

The instrument can, therefore, be calibrated by the choice of K to indicate any one desired value of R.

It has been found that every airplane has a maximum critical air speed corresponding to a definite Mach number where compressibility effects occur. This limiting speed may be determined preferably by experimental flight data taken during test flights at or as close to the critical speed as possible, during which the ratio $R_c$ of the absolute total to the absolute static pressure as obtained by the Pitot tube is accurately measured. The instrument can then be calibrated by adjusting the lever arms $L_1$ and $L_2$ so that the calibration factor, $$K = \frac{L_2}{L_1} = R_c$$

and the dials set upon the dial stems so that when the pressure ratio R applied to the bellows 12 and 17 is equal to $R_c$ the warning signal areas 75 and 76 of dial 68 will be fully visible through the opening 76 and 77 of dial 73.

For airplanes in current production it has been found that the calibration factor K may have values ranging from 1.2 to 1.6 depending upon their particular aerodynamic design characteristics.

Referring now to Figures 5 and 6 the operation of this alternative arrangement is based upon the same principles as hereinbefore described in connection with the apparatus of Figures 1 to 4. However, since in the mechanism of Figures 5 and 6 the gear segments 50 and 51 act in opposition to one another upon a common pinion 80, the net displacement of the hand 82 is proportional to the difference of the forces exerted on said pinion 80 by bellows 12 and 17. By choosing the calibration factor K and adjusting levers $L_1$ and $L_2$ as hereinbefore described, the hand 82 is caused to point to the colored warning area 86 as shown in dotted lines 82' when the critical pressure ratio $R_c$ corresponding to the value K is impressed between bellows 12 and 17 by the pitot 35.

Automatic actuation of the recovery flap 91 may be effected by the apparatus of Figure 6 when the critical pressure ratio $R_c$ corresponding to a relative air speed at which compressibility effects occur is as follows. When the hand 82 moves into position adjacent the colored area 86 as illustrated in dotted lines at 82', the contactor button 89 is moved onto and makes contact with the contactor segment 88. The electrical circuit is thus closed from the ground conductor 100 through the contacts 89 and 88 through conductor 98, battery B to the switch S. If the switch S has previously been closed into contact with point 120 the electrical circuit is thus completed from switch S through conductor 96, relay magnet 95, conductor 99 and returned through the ground circuit. The resultant energization of the relay magnet 95 moves the relay armature 103 into contact with point 106. The flap actuating motor M is thus energized from battery 114 through conductor 115, armature 103, relay point 106, conductor 113, limit switch 112 and conductor 108 and return through the common conductor lead 109. The flap actuator motor M then moves the flap 91 from the closed position into the position shown in dotted lines at 91' at which point the arm 117 is moved into the fully opened position shown in dotted lines at 117' to actuate the limit switch 112.

At reduced relative air velocities at which the contact button 89 breaks contact with the contactor segment 88 with the resultant de-energization of magnet 95, the relay armature 103 will return to the position shown in contact with point 104. The resultant reverse energization of the flap actuator motor M from the battery 114 through conductor 115, relay armature 103, point 104, conductor 111, limit switch 110, field conductor 107 and return through the common conductor 109 will result in moving the flap as indicated at 91' from the fully opened position into the closed position shown at 91, in which position the arm 117 will be brought into contact with the actuating plunger of the limit switch 110 which will in turn open the circuit between conductors 111 and 107 to stop the motion of the flap in the said fully closed position.

If a visual warning signal of the approach of a critical air speed is desired, the switch S may be moved into contact with point 121 under which conditions the light 101 will be operated to give a visual warning of the approach and attainment of a critical air speed. If neither automatic actuation of flaps or operation of a warning light is desired, the switch S may be maintained in a neutral position as illustrated and the instrument then observed in the usual manner as hereinbefore described to obtain a visual indication of the approach or attainment of critical speeds.

The apparatus of Figures 1 to 4 may obviously also be equipped with electrical contacts in the manner of the apparatus of Figures 5 and 6 to accomplish automatic actuation of control surfaces or warning signals in the manner hereinbefore described.

While in the preferred embodiment illustrated in the drawings, adjustment of the instrument to the required calibration factor K, has been shown and described as accomplished by the convenient method of varying the relative length of levers $L_1$ and $L_2$. other means can obviously be employed to obtain the same result such as changing the gear ratios of one bellows gear train with respect to the other or varying the areas of the bellows with respect to one another or modifying the relative constants of bellows springs 25 and 26 or a combination of one or more of these means may be employed.

The foregoing is merely illustrative of a preferred embodiment of the invention and is not to be considered limiting. Many modifications may be made by those skilled in the art and the invention is to be understood to include any apparatus which accomplishes the objects of the invention within the scope of the appended claims.

I claim:

1. A critical Mach number indicator comprising a first means responsive to a total pressure which is a sum of the absolute static and dynamic pressure at a given point in a relative fluid stream, a second means responsive to the absolute static pressure in said relative fluid stream in the region of said given point, said first and second means including evacuated balancing means, and an indicator actuated by said first and second means and adapted to indicate the existence of a given predetermined ratio between the absolute total pressure and the absolute static pressure.

2. A critical Mach number indicator comprising a first means responsive to a total pressure which is the sum of the absolute static and dynamic pressure at a given point in the relative fluid stream, a second means responsive to the absolute static pressure in said relative fluid stream in the region of said given point, the responsiveness of said second means being a predetermined multiple of the responsiveness of said first means, said first and second means including evacuated balancing means, and an indicator actuated by said first and second means and adapted to indicate the existence of a given predetermined ratio between the said absolute total pressure and the said absolute static pressure.

3. A critical Mach number indicator comprising a first means responsive to a total pressure which is the sum of the absolute static and dynamic pressure at a given point in the relative fluid stream, a second means responsive to the absolute static pressure in said relative fluid stream in the region of said given point, said first and second means including evacuated balancing means, and a first indicator actuated by said first responsive means and a second indicator actuated by said second responsive means and arranged to cooperate with said first indicator to indicate the existence of a given predetermined ratio between the said absolute total pressure and the said absolute static pressure.

4. A critical Mach number indicator comprising a first means responsive to a total pressure which is the sum of the absolute static and dynamic pressure at a given point in the relative fluid stream, a second means responsive to the absolute static pressure in said relative fluid stream in the region of said given point, said first and second means including evacuated balancing means, the responsiveness of said second means being a predetermined multiple of the responsiveness of said first means, and a first indicator actuated by said first responsive means and a second indicator actuated by said second responsive means, and arranged to cooperate with said first indicator to indicate the existence of a given predetermined ratio between the said absolute total pressure and the said absolute static pressure.

5. A critical Mach number indicator according to claim 4 in which the said first and second indicators comprise superimposed members movable with respect to one another and adapted to fully expose a signal at only the said given predetermined pressure ratio.

6. A critical Mach number indicator according to claim 4 in which the said first and second indicators comprise concentrically pivoted superimposed dials rotatable with respect to one another and adapted to fully expose a signal at only the said given predetermined pressure ratio.

7. A critical Mach number indicator comprising a first means responsive to a total pressure which is the sum of the absolute static and dynamic pressure at a given point in the relative fluid stream, a second means responsive to the absolute static pressure in said relative fluid stream in the region of said given point said first and second means including evacuated balancing means, means coupling said first means and said second means together in opposition to one another and an indicator actuated by said coupling means and adapted to be actuated in accordance with the resultant of the opposition of said first and said second means to indicate the existence of a given predetermined ratio between the said absolute total pressure and the said absolute static pressure.

8. A critical Mach number indicator comprising a first means responsive to a total pressure which is the sum of the absolute static and dynamic pressure at a given point in the relative fluid stream, a second means responsive to the absolute static pressure in said relative fluid stream in the region of said given point, the responsiveness of said second means being a predetermined multiple of the responsiveness of said first means said first and second means including evacuated balancing means, means coupling said first means and said second means together in opposition to one another and an indicator actuated by said coupling means and adapted to be actuated in accordance with the resultant of the opposition of said first and second means to indicate the existence of a given predetermined ratio between the said absolute total pressure and the said absolute static pressure.

9. Apparatus according to claim 1 and means controlled by said indicator to automatically lower a recovery control surface at said given predetermined pressure ratio.

10. Apparatus according to claim 2 and means controlled by said indicator to automatically lower a recovery control surface at said given predetermined pressure ratio.

11. Apparatus according to claim 7 and means controlled by said indicator to automatically lower a recovery control surface at said given predetermined pressure ratio.

12. Apparatus according to claim 8 and means controlled by said indicator to automatically lower a recovery control surface at said given predetermined pressure ratio.

WARD W. BEMAN.

REFERENCES CITED

The following references are of record in the file of this patent:

UNITED STATES PATENTS

| Number | Name | Date |
|---|---|---|
| 1,296,947 | Blot-Garnier | Mar. 11, 1919 |
| 1,433,536 | Dugit-Gros | Oct. 31, 1922 |
| 2,011,517 | Geoffrion | Aug. 13, 1935 |
| 2,176,817 | Jacobsen et al. | Oct. 17, 1939 |
| 2,272,664 | Gropler | Feb. 10, 1942 |
| 2,279,615 | Bugatti | Apr. 24, 1942 |
| 2,309,015 | Royer | Jan. 19, 1943 |

FOREIGN PATENTS

| Number | Country | Date |
|---|---|---|
| 274,082 | Great Britain | July 26, 1928 |
| 311,326 | Italy | Sept. 27, 1933 |
| 494,916 | France | June 12, 1919 |
| 591,646 | France | Apr. 15, 1925 |